United States Patent
Engelhardt et al.

(10) Patent No.: US 6,852,964 B2
(45) Date of Patent: Feb. 8, 2005

(54) METHOD AND ARRANGEMENT FOR SCANNING MICROSCOPIC SPECIMENS WITH A SCANNING DEVICE

(75) Inventors: Johann Engelhardt, Bad Schoenborn (DE); Werner Knebel, Kronau (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 256 days.

(21) Appl. No.: 09/989,275

(22) Filed: Nov. 19, 2001

(65) Prior Publication Data

US 2002/0060285 A1 May 23, 2002

(30) Foreign Application Priority Data

Nov. 23, 2000 (DE) .......................................... 100 58 100

(51) Int. Cl.⁷ ................................................ G02B 7/04
(52) U.S. Cl. .................................... 250/201.3; 250/234
(58) Field of Search ................................ 250/234, 235, 250/221, 201.3, 559.4, 559.44, 559.06, 559.22, 559.04; 382/204, 205, 216, 284

(56) References Cited

U.S. PATENT DOCUMENTS

| | | | | |
|---|---|---|---|---|
| 4,827,141 A | * | 5/1989 | Zwirn | 250/559.4 |
| 5,844,598 A | * | 12/1998 | Janesick | 348/79 |
| 6,134,009 A | * | 10/2000 | Zavislan | 356/364 |
| 6,134,010 A | * | 10/2000 | Zavislan | 356/364 |
| 6,577,394 B1 | * | 6/2003 | Zavislan | 356/369 |
| 2003/0133009 A1 | * | 7/2003 | Brown et al. | 348/61 |

FOREIGN PATENT DOCUMENTS

WO   WO 96 377 97   11/1996

OTHER PUBLICATIONS

Werner Zuschratter et al. "Acquisition of multiple image stacks with a confocal laser scaning" in Proceedings of SPIE vol. 3261, pp. 177–188.

Georg Erich Steiner, et al., Automated data acquisition by confocal laser scanning microscopy and image analysis of triple stained immunofluorescent leukocytes in tissue, Journal of Immunological Methods 237 (2000) 39–50 Apr. 1999.

* cited by examiner

Primary Examiner—Que T. Le
(74) Attorney, Agent, or Firm—Davidson, Davidson & Kappel, LLC

(57) ABSTRACT

The present invention discloses a method and an arrangement for scanning microscopic specimens (15) with a scanning device. The microscopic specimen (15) is displaceable on a specimen stage (35) in at least two spatial directions. A light beam (3) scans the specimen (15) within a defined scan field (52) by way of a scanning module (7), and the light (17) proceeding from the specimen is detected. A PC (34) is also provided for analysis and calculation. The scan field (52) is defined in such a way that it incompletely encompasses a specimen region that is to be examined. Means (23, 31) are provided which displace the specimen stage (35) in such a way that the entire specimen region of interest can be covered by the plurality of resulting scan fields ($52_1$, $52_2$, ... $52_n$). The data of the individual scan fields ($52_1$, $52_2$, ... $52_n$) detected from the specimen region being examined are assembled in the PC (34) into an overall image.

18 Claims, 4 Drawing Sheets

METHOD AND ARRANGEMENT FOR SCANNING MICROSCOPIC SPECIMENS WITH A SCANNING DEVICE

CROSS REFERENCE TO RELATED APPLICATIONS

This invention claims priority of the German patent application 100 58 100.5 which is incorporated by reference herein.

FIELD OF THE INVENTION

The invention concerns a method for scanning microscopic specimens with a scanning microscope, in particular with a confocal scanning microscope. The invention concerns as well a method for scanning a specimen, located on a specimen stage defining an X-Y plane, with a scanning device which possesses an optical system and defines a scan field that incompletely encompasses a region of the specimen that is to be examined.

The invention further concerns an arrangement for examining microscopic specimens that are larger than the scan field of the microscope. The invention in particular concerns an arrangement for scanning microscopic specimens having: a scanning device; a specimen stage, defining an X-Y plane, with which the microscopic specimen is displaceable at least in the X-Y plane; a light beam that, by way of a scanning module and an optical system, scans the specimen within a defined scan field and detects the light proceeding from the specimen; and a PC.

BACKGROUND OF THE INVENTION

In cell biology, for example, neurons presently are examined with conventional light microscopes. The cells inclusive of their dendrites are often larger than the field size, determined substantially by the aperture of the objective, of the microscope. A larger field can be observed with low-magnification objectives, but usually the requisite resolution cannot be obtained therewith.

An attempt is made to solve this problem by manually delineating the image of the specimen piece by piece, successive different parts of the specimen being shifted into the observation field of the conventional microscope and manually focused in each case.

It often takes hours to obtain an overall view of a specimen that is large as compared to the field size, for example of a neuron with its long dendrites; this is thus very time-consuming and consequently cost-intensive. In addition, the lifetime of suitably prepared cells is sometimes only in the range of one to two hours, so that certain experiments cannot be performed at all.

It is possible to acquire the image of a specimen more quickly and accurately using a suitable scanning device. The scanning device can also be constituted by a scanning microscope. In scanning microscopy, a sample is illuminated with a light beam in order to observe the reflected or fluorescent light emitted from the sample. The focus of the illuminating light beam is moved in a specimen plane with the aid of a controllable beam deflection device, generally by tilting two mirrors; the deflection axes are usually perpendicular to one another so that one mirror deflects in the X and the other in the Y direction. Tilting of the mirrors is brought about, for example, using galvanometer positioning elements. The power level of the light coming from the specimen is measured as a function of the position of the scanning beam. Ideally, the track of the scanning light beam describes a meander on or in the specimen (scan one line in the X direction at constant Y position; then stop X scanning and slew by Y displacement to the next line to be scanned; then, at constant Y position, scan that line in the negative X direction, etc.).

For fundamental reasons, however, the scan region of a scanning microscope is no larger than that of a conventional light microscope that is equipped with comparable optical elements (objective, tube lens, etc.). A scanning microscope nevertheless offers the advantage of storing the image data of a scan region and scanning the adjacent regions in subsequent steps. In this context, the specimen is successively displaced in meander fashion using a displacement stage. With the aid of suitable software, the image data that correspond to the individual adjacent scan regions are then linked to one another so they can be assembled into one overall image. Here again, it is desirable to arrange the scan region serially in meander fashion, in order to eliminate redundancies. To carry out this method, the specimen table is usually moved automatically in computer-controlled fashion until the entire specimen plane has been scanned. A procedure of this kind is described in W. Zuschratter, T. Steffen, K. Braun, A. Herzog, B. Michaelis, and H. Scheich (1998), "Acquisition of multiple image stacks with a confocal laser scanning microscope" in Three-Dimensional and Multidimensional Microscopy: Image Acquisition and Processing, V. Carol, J. Cogswell, J. A. Conchello, J. M. Lerner, T. Lu, T. Wilson (eds.), Proceedings of SPIE Vol. 3261, pp. 177–186.

When linking the image data that correspond to the individual adjacent scan regions, the software has the task of taking into account image distortions, for example pincushion distortions. Mere "sequential copying" of the relevant image data is generally not sufficient, and yields very poor results. An angular error between the displacement directions of the specimen stage and the scanning axes ("crabbing error") is very particularly troublesome in this context.

In most cases the specimens that are to be scanned are not flat but rather are three-dimensional objects, which greatly complicates documentation in particular by manual delineation, and sometimes yields unsatisfactory results.

It is first of all conceivable to use a confocal scanning microscope, which is inherently capable of scanning a specimen three-dimensionally. In confocal scanning microscopy, a specimen is scanned in three dimensions with the focus of a light beam. A confocal scanning microscope generally comprises a light source, a focusing optical system with which the light of the source is focused onto a pinhole (called the "excitation stop"), a beam splitter, a beam deflection device for beam control, an optical system, a detection stop, and the detectors for detecting the detected or fluorescent light. The illuminating light is coupled in via a beam splitter. The fluorescent or reflected light coming from the specimen arrives via the beam deflection device back at the beam splitter, passes through it, and is then focused onto the detection stop behind which the detectors are located. Detected light that does not derive directly from the focus region takes a different light path and does not pass through the detection stop; a point datum is thus obtained that results, by sequential scanning of the specimen, in a three-dimensional image. A three-dimensional image is usually achieved by image acquisition in layers; a scan field that is defined by the focusing optical system is displaced correspondingly by way of a relative motion between the specimen stage and the focusing optical system. The result of this relative motion is that the scan field is moved in the Z direction through the specimen being examined.

Since the horizontal cross section of the scan volume of a confocal scanning microscope is again, when comparable optics are used, in principle no larger than the field size of a conventional light microscope, the fundamental difficulty of scanning specimens that are larger than the scan field size is not overcome simply by using a confocal scanning microscope.

In confocal scanning microscopy it is also possible and usual to obtain, by meander-shaped displacement of the specimen, image information from the specimen that is larger than the scan field being used. Scanning is performed in different layers for each scan field, and the image data obtained are then linked into one coherent image. The image data encompass the entire space containing the specimen. It is easy to imagine that in the case of specimens branching off extensively in three dimensions, a great deal of unnecessary space containing no image data is also scanned. Time is wasted in scanning, since regions which contain no specimen image data are scanned unnecessarily.

Just like the manual delineation method, the scanning-microscopy methods described above are very time-consuming. In addition, the results of the image data linkage are not satisfactory because aberrations are not taken into account.

SUMMARY OF THE INVENTION

It is the object of the invention to create a method which makes possible the rapid and efficient scanning of specimens that are larger than the scan region of a microscope.

The aforesaid object is achieved by a method that comprises the following steps:
  scanning a portion of the specimen region to be examined with a first scan field,
  displacing the specimen stage in the X-Y plane to scan, with further scan fields, further portions of the specimen region to be examined, in such a way that the entire specimen region to be examined ends up within the plurality of scan fields; and
  linking the specimen data obtained from the plurality of scan fields.

A further object of the invention is to create an arrangement with which it is possible to scan larger microscopic specimen fields quickly and efficiently. In addition, the arrangement is to be configured in such a way that image acquisition is possible during the limited lifetime of biological preparations.

The above object is achieved by an arrangement which comprises:
  a scanning device;
  a specimen stage defining an X-Y plane, with which the microscopic specimen is displaceable at least the X-Y plane;
  a scanning module and an optical system that scan a light beam within a defined scan field across the specimen and detects the light proceeding from the specimen; wherein the scan field is defined in such a way that it incompletely encloses a specimen region of interest that is to be examined;
  means for moving the specimen stage so that the entire specimen region of interest can be covered by the plurality of scan fields; and
  a PC, wherein the PC assembles an overall image from the detected data of the plurality of scan fields of the specimen region to be examined.

An advantage of the invention is that specimens which are larger than a current scan field can be covered effectively and quickly. It is particularly important here that the invention is designed in such a way that several scan fields are distributed over a sample region to be examined. Care must be taken, in the distribution, that each scan field encloses at least a portion of the specimen to be examined. Scanning of the specimen region to be examined is confined exclusively to specimen structures. Scan fields that contain no specimen structures are not covered by the scanning operation. This yields a considerable time saving, since fields that contain only background information are not scanned. The scanning operation according to the present invention is confined exclusively to information-containing scan fields. It is particularly advantageous if the user, using a designation means, outlines or otherwise designates on the display the specimen region to be examined. The plurality of scan fields that are necessary in order to cover the enclosed specimen region are automatically distributed.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
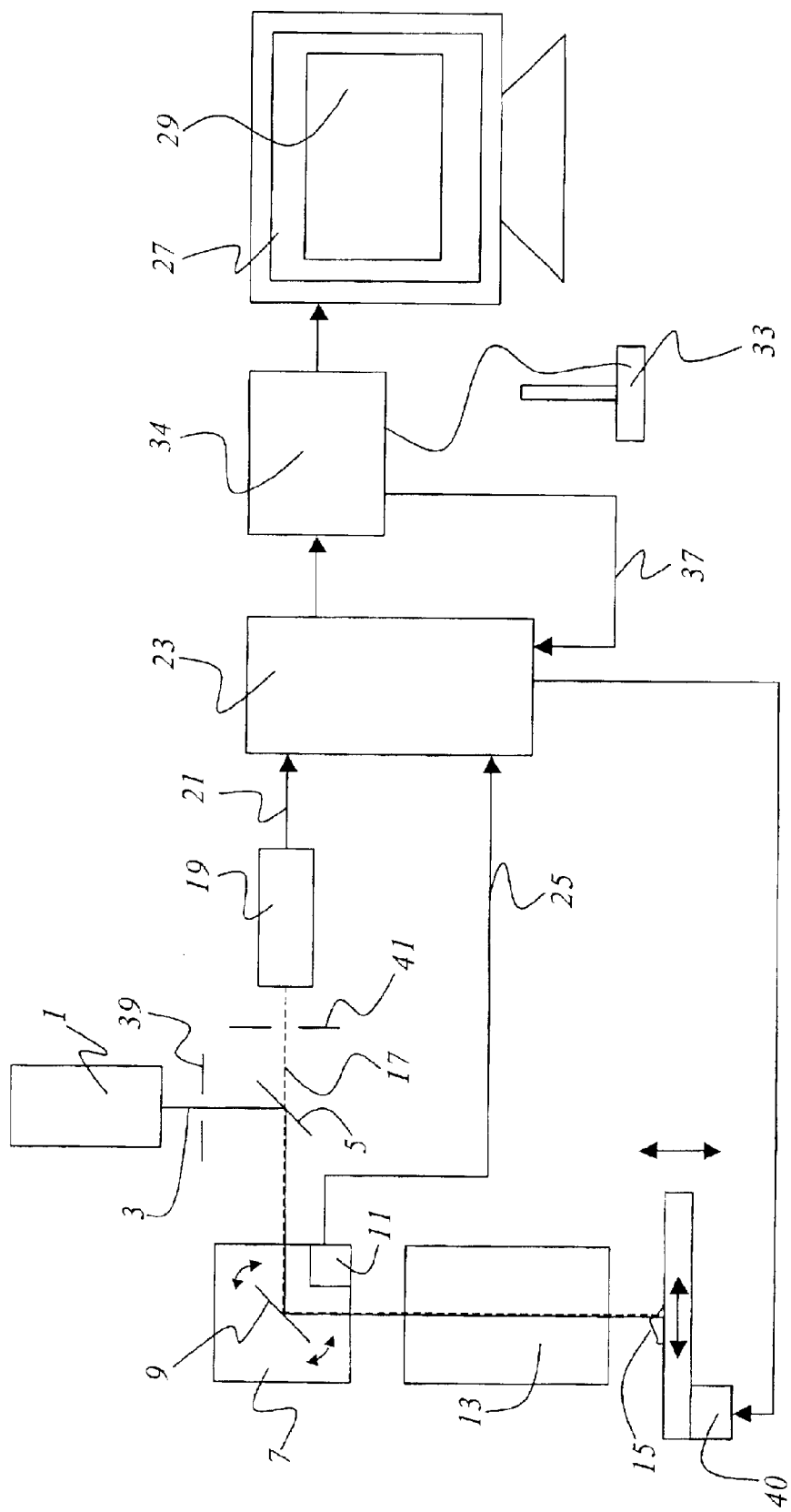
FIG. 1 shows an arrangement according to the present invention having a confocal microscope that uses the invention.

FIG. 1 schematically depicts a scanning device. In a particular embodiment of the invention, the scanning device is a confocal scanning microscope. It is self-evident that a completely equipped scanning microscope is not absolutely necessary for scanning a specimen. Rather it is sufficient to mount or position in suitable fashion the optical components necessary for a scanning operation. The description below refers exclusively to a scanning microscope, but this is in no way to be construed as a limitation of the invention. Light beam 3 coming from an illumination system 1 is reflected by a beam splitter 5 to scanning module 7, which contains a gimbal-mounted scanning mirror 9 that guides the beam, through optical system 13, over or through specimen 15. In the case of nontransparent specimens 15, light beam 3 is guided over the specimen surface. In the case of biological specimens 15 (preparations) or transparent specimens, light beam 3 can also be guided through specimen 15. This means that different focal planes of the specimen are scanned successively by light beam 3. Subsequent assembly then yields a three-dimensional image of the specimen. In all the illustrations (FIGS. 1 through 2), light beam 3 coming from illumination system 1 is depicted as a solid line. Light 17 proceeding from specimen 15 passes through optical system 13 and via scanning module 7 to beam splitter 5, passes through the latter, and strikes detector 19, which is embodied as a photomultiplier. In all the illustrations (FIGS. 1 through 2), light 17 proceeding from specimen 15 is depicted as a dashed line. In detector 19, electrical detection signals 21 proportional to the power level of light 17 proceeding from the specimen are generated and are forwarded to processing unit 23. Positional signals 25, acquired in the scanning module with the aid of an inductively or capacitatively operating position sensor 11, are also transferred to processing unit 23. It is self-evident to one skilled in the art that the position of scanning mirror 9 can also be ascertained by way of the adjustment signals. The incoming analog signals are first digitized in processing unit 23.

The positional and detected signals are associated with one another in processing unit 23, and assembled into an image 29 that is displayed on display 27. Illumination pinhole 39 and detection pinhole 41 that are usually provided in a confocal scanning microscope are drawn in schematically for the sake of completeness. Omitted in the interest of better clarity, however, are certain optical elements for guiding and shaping the light beams; these are sufficiently known to those skilled in this art.

With the aid of joystick 33, the user can define the spatial direction in which specimen stage will move. The reference data are transferred from PC 34, to which the joystick is connected, to control unit 23, which then correspondingly moves the stage with the aid of displacement device 40. Displacement device 40 contains three displacement motors (not shown), which can move specimen stage 35 in any spatial direction. The reference data input via the joystick are taken into account by PC 34 when creating image 29. The apparatus is configured in such a way that specimen stage 35 stops after a certain displacement travel, and prevents further input of reference data with the joystick until scanning at the assumed position is complete. Only after scanning at the assumed position is complete can the stage be positioned again. All the image data obtained are stored in PC 34 in an overall image data set.

Figure 2:
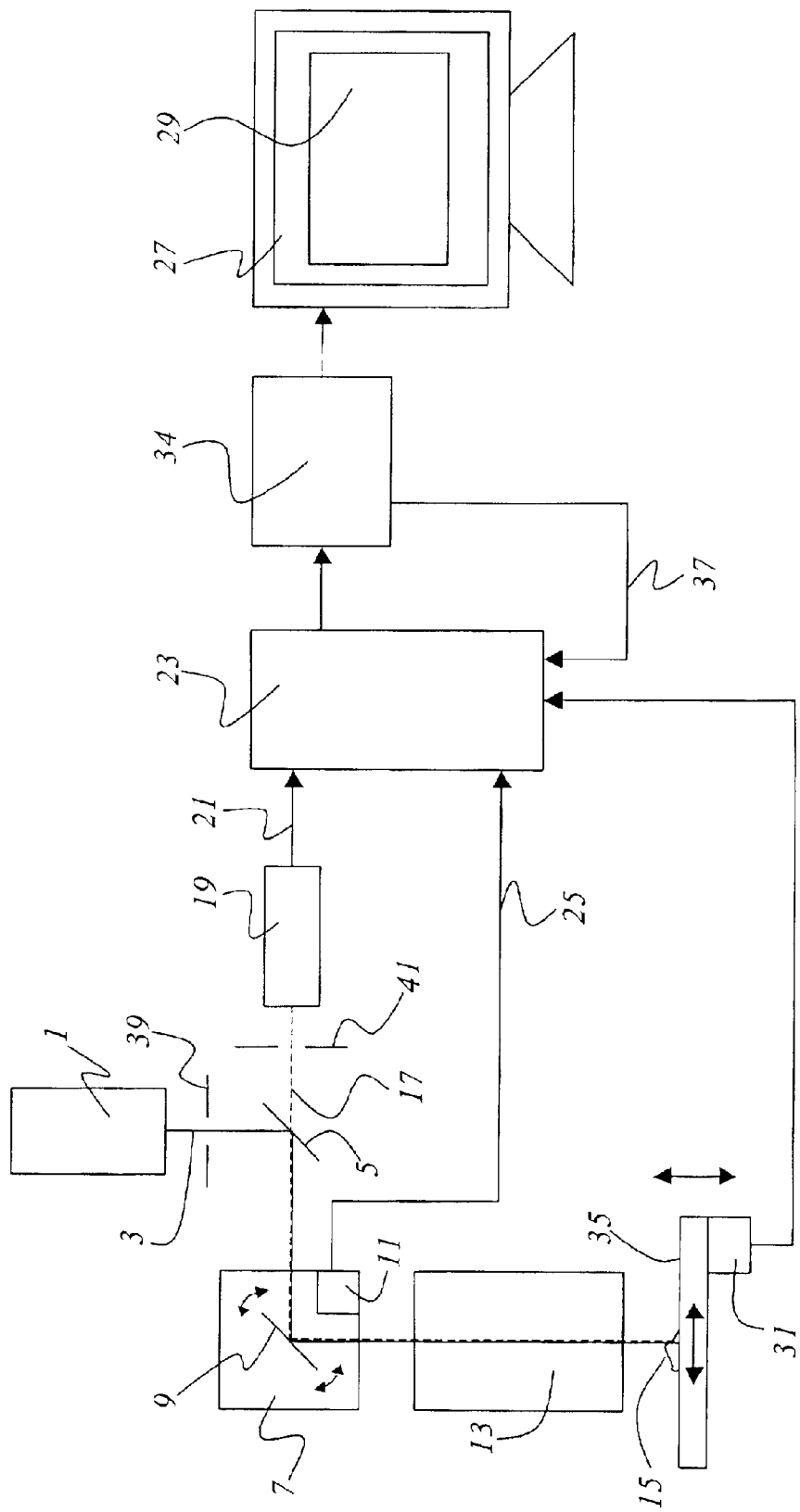
FIG. 2 shows a specific embodiment of the arrangement according to the present invention having a confocal microscope that comprises a manual stage displacement system.

FIG. 2 shows an embodiment analogous to FIG. 1 with manual stage control. Specimen stage 35 is moved with the aid of the usual displacement screws (not shown here). The position of specimen stage 35 is continuously sensed with the aid of stage position sensor 31, and forwarded to control unit 23. Specimen stage 35 can be moved at any time, scanning being continuously performed without interruption. Distortions caused by the movement of the specimen stage are corrected by PC 34.

Figure 3:
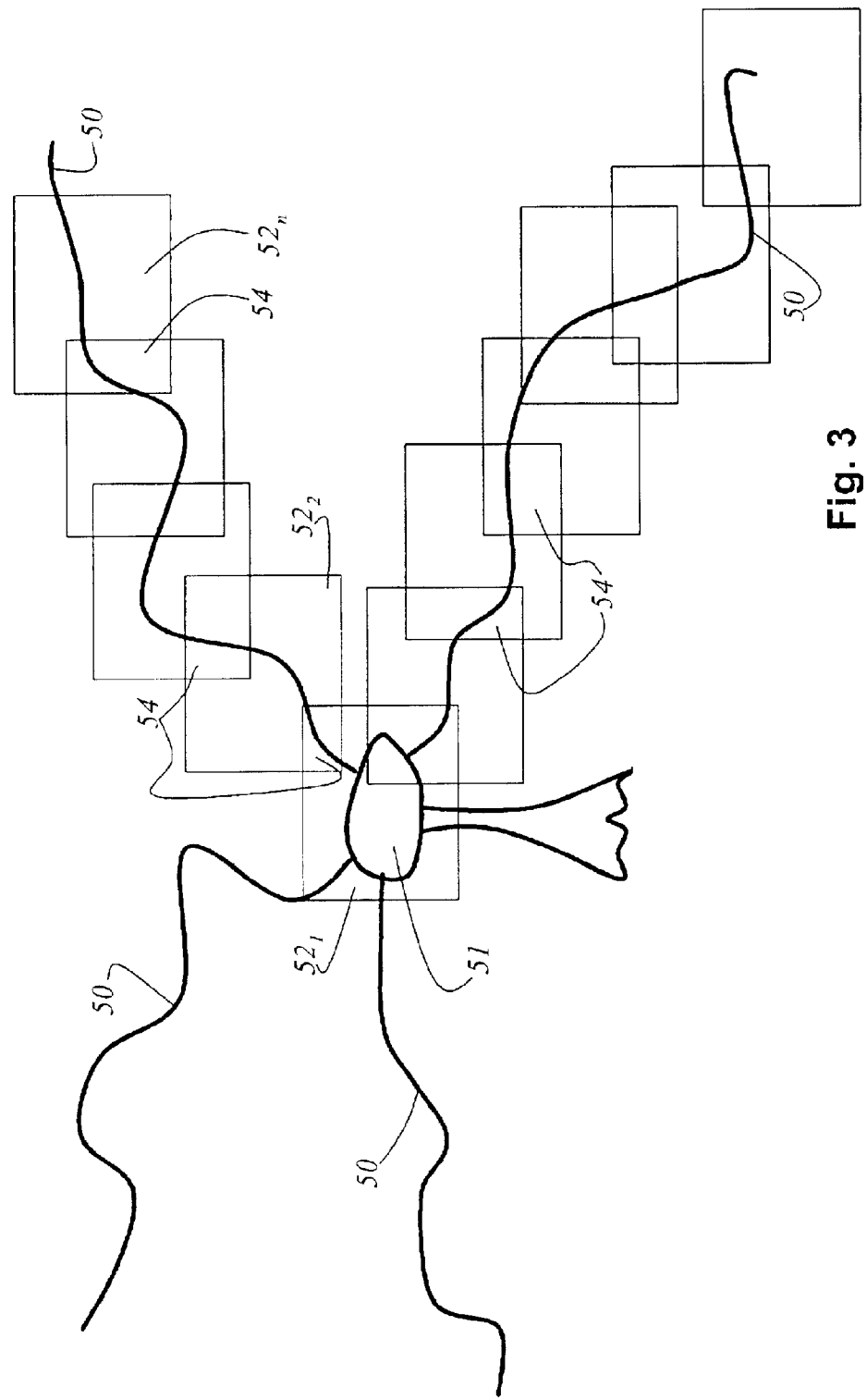
FIG. 3 schematically depicts the scanning operation according to one embodiment of the invention.

FIG. 3 schematically shows the method being executed. A cell 51 with dendrites 50 is shown. First, a first scan field $52_1$ is scanned. Then the user selects a further scan region which is then scanned. Overlap region 54 is consequently scanned twice, resulting in optimum association of the positional and detected data of the two scan fields $52_1$ and $52_2$ when the image data are processed. The user can use a plurality of scan fields $52_1$, $52_2$, and $52_n$ to cover a specimen region 55 that is to be examined. An overall image is assembled from the individual scan fields $52_1$, $52_2$, and $52_n$. As already mentioned above, overlap regions 54 of the respective scan fields are scanned twice, resulting in optimum association of the positional and detected data.

Figure 4:
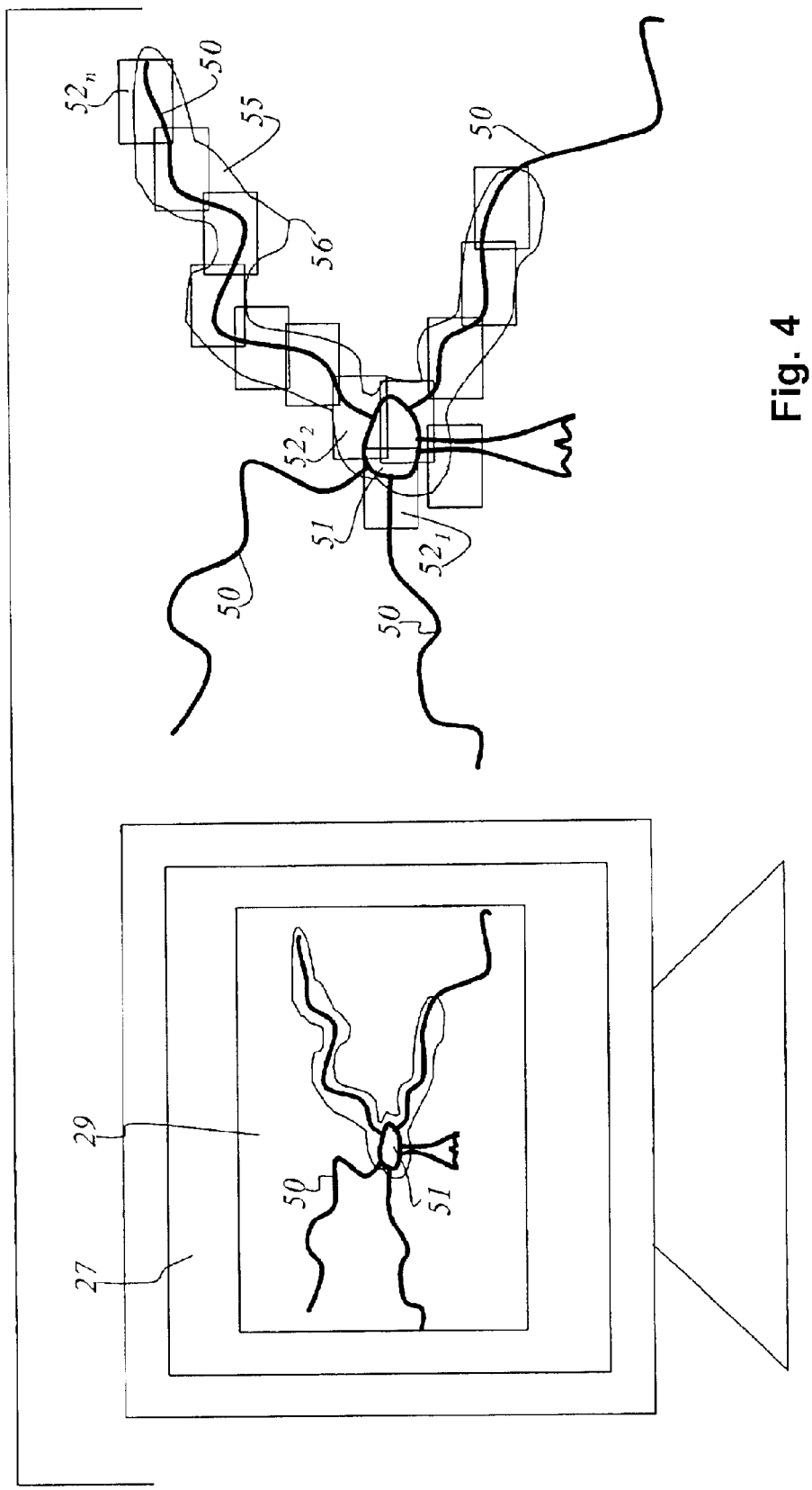
FIG. 4 schematically depicts the scanning operation according to a further embodiment of the invention.

FIG. 4 shows a further embodiment for scanning a specimen region 55 to be examined. Specimen region 55 to be examined is defined by means of a designation means, for example joystick 33. Specimen region 55 to be examined is outlined using the designation means, thereby defining a boundary line 56 inside which the plurality of scan fields $52_1$, $52_2$, and $52_n$ are automatically distributed. The structures of interest are thereby enclosed by the plurality of scan fields $52_1$, $52_2$, and $52_n$.

The invention was described with reference to a particular embodiment. It is nevertheless apparent that changes and modifications can be made without thereby leaving the range of protection of the claims recited hereinafter.

What is claimed is:

1. A method for scanning a specimen, located on a specimen stage defining an X-Y plane, with a scanning device which possesses an optical system and defines a scan field that incompletely encompasses a region of the specimen that is to be examined, comprising the following steps:

defining a specimen region to be examined on a display using a marking line;

scanning a portion of the specimen region to be examined with a first scan field, displacing the specimen stage in the X-Y plane to scan, with further scan fields, further portions of the specimen region to be examined, in such a way that the entire specimen region to be examined is covered with a plurality of scan fields, whereby each of the plurality of scan fields cover at least a respective portion of the specimen region to be examined; and linking specimen data obtained from the plurality of scan fields.

2. The method as defined in claim 1, wherein the specimen region to be examined is determined by manual adjustment of the specimen stage in the X-Y plane.

3. The method as defined in claim 1, wherein in the specimen region to be examined, the user, by means of a joystick, displaces the specimen stage in the spatial directions defined thereby, the adjustment data ascertained by the joystick being transferred to a PC and to a control unit which correspondingly displaces the specimen stage in the X-Y plane.

4. The method as defined in claim 1, wherein the scan fields are automatically distributed by the PC over the specimen region to be examined, so that the specimen region defined by the marking line is covered by the plurality of specimen regions; and the specimen stage is automatically displaced in the X-Y plane.

5. The method as defined in claim 4, wherein the PC automatically ascertains, on the basis of the automatically distributed scan fields, adjustment data that are transferred to the control unit, which correspondingly displaces the specimen stage.

6. The method as defined in claim 1, wherein a Z direction is defined perpendicular to the X-Y plane; and the displacement of each scan field in the Z direction is achieved by a relative motion between the specimen stage and the optical system.

7. The method as defined in claim 1, wherein the scan fields partially overlap and thereby define an overlap region.

8. The method as defined in claim 1, wherein the size of the scan field is determined by the optical system of the scanning device.

9. The method as defined in claim 1, wherein the scanning device is constituted by a scanning microscope.

10. An apparatus for scanning microscopic specimens, comprising a scanning device;

a specimen stage defining an X-Y plane, with which the microscopic specimen is displaceable at least the X-Y plane;

a scanning module and an optical system that scan a light beam within a defined scan field across the specimen and detects the light proceeding from the specimen; wherein the scan field is defined in such a way that it incompletely encloses a specimen region of interest that is to be examined;

a designation means with which the specimen region to be examined is defined on a display by a marking line;

means for moving the specimen stage so that the entire specimen region of interest can be covered by a plurality of scan fields whereby each of the plurality of scan fields cover at least a respective portion of the specimen region to be examined; and a PC, wherein the PC assembles an overall image from the detected data of the plurality of scan fields of the specimen region to be examined.

11. An apparatus as defined in claim 10, wherein the specimen stage is manually adjustable in the X-Y plane and the specimen region to be examined can thereby be determined.

12. An apparatus as defined in claim 10, wherein a joystick is provided with which the user displaces the specimen stage in the X-Y plane in such a way and thus determines the specimen region to be examined, and the PC transfers to a control unit the adjustment data ascertained by the joystick.

13. An apparatus as defined in claim 10, wherein on the basis of the marking line, the scan fields are automatically distributed by the PC over the specimen region to be examined in such a way that by automatic displacement of the specimen stage in the X-Y plane, the specimen region defined by the marking line is covered by the plurality of scan fields.

14. An apparatus as defined in claim 13, wherein the PC, on the basis of the automatically distributed scan fields, ascertains adjustment data that can be transferred to the control unit, which correspondingly displaces the specimen stage.

15. An apparatus as defined in claim 10, wherein a Z direction is defined perpendicular to the X-Y plane; and the displacement of each scan field in the Z direction is achieved by a relative motion between the specimen stage and the optical system.

16. The apparatus as defined in claim 10, wherein the scan fields partially overlap and thereby define an overlap region.

17. An apparatus as defined in claim 10, wherein the size of the scan field is determined by an optical system of the scanning device.

18. An apparatus as defined in claim 10, wherein the scanning device is a scanning microscope.

* * * * *